United States Patent
Cardinal et al.

(10) Patent No.: US 6,369,935 B1
(45) Date of Patent: Apr. 9, 2002

(54) ELECTROCHROME GLAZING

(75) Inventors: Jens Cardinal, Dortmund; Volker Gumprich, Cologne; Hartmut Wittkopf, Gelsenkirchen, all of (DE)

(73) Assignee: Flabeg GmbH & Co. KG, Fuerth (DE)

( * ) Notice: Subject to any disclaimer, the term of this patent is extended or adjusted under 35 U.S.C. 154(b) by 0 days.

(21) Appl. No.: 09/763,854

(22) PCT Filed: Aug. 28, 1999

(86) PCT No.: PCT/DE99/02790

§ 371 Date: Apr. 9, 2001

§ 102(e) Date: Apr. 9, 2001

(87) PCT Pub. No.: WO00/13060

PCT Pub. Date: Mar. 9, 2000

(30) Foreign Application Priority Data

Sep. 1, 1998 (DE) .......................... 198 39 748

(51) Int. Cl.[7] .......................... G02F 1/153; G02F 1/15; G02F 1/01; G02F 1/03; H01L 29/12
(52) U.S. Cl. .......................... 359/265; 359/269; 359/288; 359/241; 428/620
(58) Field of Search .......................... 359/269, 272, 359/288, 241, 275; 428/620

(56) References Cited

U.S. PATENT DOCUMENTS

| 5,231,531 A | 7/1993 | Defendini et al. |
| 5,377,042 A | 12/1994 | Chahroudi |
| 5,404,245 A | 4/1995 | Chahroudi |
| 5,524,381 A | 6/1996 | Chahroudi |
| 5,525,430 A | 6/1996 | Chahroudi |
| 6,094,290 A * | 6/2000 | Crawford et al. ........... 359/241 |

FOREIGN PATENT DOCUMENTS

| DE | 196 30 812 A1 | 2/1998 |
| DE | 197 06 918 A1 | 8/1998 |
| EP | 0 475 847 B1 | 3/1992 |
| WO | WO95 31746 | 11/1995 |
| WO | WO98 08137 | 2/1998 |

* cited by examiner

*Primary Examiner*—Ricky Mack
*Assistant Examiner*—Michael A. Lucas
(74) *Attorney, Agent, or Firm*—Marshall & Melhorn, LLC

(57) ABSTRACT

The invention concerns an electrochromic glazing system, with an electrochromic pane unit and at least one other pane, which are joined to one another in the edge area by means of a spacer frame, forming an interspace, and with a temperature sensor for detection of the temperature of the electrochromic pane unit. To optimize its location, according to the invention the temperature sensor is arranged in the region of the spacer frame, between the electrochromic pane unit and the other pane. The invention takes advantage of the fact that the spacer frame area represents a thermal bridge between the panes of a double-glazing unit which is especially suitable for the arrangement of a temperature sensor.

10 Claims, 4 Drawing Sheets

ELECTROCHROME GLAZING

BACKGROUND OF THE INVENTION

1. Field of the Invention

The invention concerns an electrochromic glazing, with an electrochromic pane unit and at least one other pane, which are joined to one another in the edge area by means of a spacer frame, forming an interspace, and with a temperature sensor for detection of the temperature of the electrochromic pane unit.

2. Summary of the Related Art

Such a glazing is known from EP 0 475 847 B1. Here the temperature sensor consists of a thermometer which is arranged so as to be in contact with one of the panes of the electrochromic pane unit. According to this publication, it is preferred to measure the temperature on the side of the electrochromic pane unit facing towards the interior of the glazed building, which is not exposed directly to the solar radiation.

Examples of the construction of electrochromic pane units are described in WO 95/31746. Generally, the first glass pane is provided with a transparent conductive layer which consists, for example, of doped tin oxide, indium-tin oxide or the like. On this conductive layer is arranged an electrochromic layer, which consists preferably of tungsten oxide ($WO_x$).

Opposite to this first electrochromic layer is a second electrochromic layer, for example of cerium-titanium oxide, vanadium-titanium oxide or the like, constituting a counter-electrode or ion storage layer, which is applied to a second conductive layer of a second glass pane. Between the electrochromic layers is located an ion conductor, in particular a polymer electrolyte, so that the electrochromic pane unit assumes the form of a laminated pane.

The temperature of the electrochromic pane unit will, particularly when using polymer electrolytes whose ion resistance may depend to a significant extent on temperature, be required as control parameter for the control of the electrochromic pane unit. Depending upon the application of the electrochromic glazing, it can be exposed to wide temperature fluctuations, frequently with brief temperature peaks on partial areas of the electrochromic glazing. With high temperatures, there is a danger that the voltages present at the electrochromic layers become excessively high, so that irreversible processes are caused and the electrochromic glazing is permanently damaged. In order to prevent this, the control voltage applied to the conductive layers of the electrochromic pane unit must be suitably modified according to temperature if a service life of the electrochromic pane unit acceptable for practical purposes is to be reached. Further details in this respect are described in DE 197 06 918 A1.

OBJECT OF THE INVENTION

It is he object of the present invention to assist control of an electrochromic glazing unit by optimizing the location of the temperature sensor for temperature detecting.

This object is solved by an electrochromic glazing in accordance with claim 1. Advantageous configurations are the subject of the subclaims.

According to the invention, provision is made for arranging the temperature sensor in the region of the spacer frame, between the electrochromic pane unit and the other pane.

The arrangement according to the invention is achieved on the one hand by the temperature sensor for its part possessing close heat transfer contact with the spacer frame, and on the other hand being arranged outside the field of vision for normal observers of the glazing. "In the region of the spacer frame" includes all arrangements where the temperature sensor is arranged on or in the spacer frame, or in the bond of the spacer frame to the panes of the glazing formed by adhesives or sealants, so that satisfactory heat transfer contact is ensured with the thermal bridge in the edge area of the glazing formed of these elements. Direct contact of the temperature sensor with the spacer frame which permits heat transfer by thermal conduction is preferable. It has been found however that adequate heat transfer can also be ensured by convection or thermal radiation if the temperature sensor is at a distance of not more than approximately 5 mm, better 2 mm, and preferably less than 1 mm from the spacer frame or from the bond.

Surprisingly, it has been found that for reliable functioning of the control system, it is not necessarily the pane temperature actually present in the electrochromic pane unit, if necessary averaged over the surface, that must be measured, but that a measured value which correlates satisfactorily with the pane temperature over a wide temperature range from approximately 20° C. to ±100° C. will suffice. For the invention, the fact is taken advantage of that the spacer frame region representing a thermal bridge between the panes of a double-glazing unit is especially suitable for arrangement of a temperature sensor. For this thermal bridge it is true to say that, in comparison with other areas of the glazing unit with less favorable thermal conduction properties, a relatively stable heat flow generally prevails. Even brief temperature peaks on partial areas of the electrochromic pane unit can surprisingly be detected comparatively reliably with a temperature sensor arranged according to the invention.

According to an advantageous embodiment, the temperature sensor is embedded at least partially in adhesive or sealant. In this way, it is invisible to the normal observer and not exposed to direct solar radiation. Furthermore, the temperature sensor is thereby secured when installed and is protected from mechanical stresses and also from corrosion. For example, the temperature sensor can be embedded in the polyisobutylene-base butyl sealant usually located between the locating walls of the spacer frame and the insides of the panes. The temperature sensor can also however be embedded in the double-glazing adhesive of polysulfide, silicone, polyurethane or the like inserted between the pane edges, which stabilizes the double-glazing mechanically. Being embedded in adhesive further improves the heat transfer from the electrochromic pane unit to the temperature sensor, which in turn improves accuracy of measurement.

Preferably, the temperature sensor is arranged directly on the surface of the inner pane of the electrochromic pane unit facing towards the interspace, but still close enough to the spacer frame for satisfactory heat transfer contact with the spacer frame to exist by means of thermal conduction, thermal radiation or convection.

Basically, within the scope of the invention, the temperature sensor should not be arranged on the pane within the field of vision of a normal observer. The temperature sensor is appropriately located on the side of the spacer frame facing towards the electrochromic pane unit.

Preferably, the spacer frame in the locating wall for the pane unit possesses a recess in which the temperature sensor is arranged. This recess can be delimited locally, but can also extend along the entire frame length. The recess is preferably curved. Other geometrical forms, for example those matched to the shape of the temperature sensor, are also possible. The provision of a recess has the effect that the temperature sensor is protected and can be accommodated in a definite place, that is to say according to profile geometry and dimensions of the temperature sensor, closer to the interspace and thus closer to the exposed area of the glazing than would be possible without such a recess.

Provision can also be made for the temperature sensor to be arranged inside the spacer frame, in particular in a desiccant cavity formed in the spacer frame. Another preferred embodiment consists of arranging the temperature sensor on the side of the inner wall of the spacer frame facing towards the interspace.

Special profile geometrical forms permit further alternatives for arrangement of the temperature sensor. Known spacer frame profiles incorporate in the locating wall towards the insides of the panes an angled section which faces away from the contiguous pane. The temperature sensor is arranged preferably between this section and the electrochromic pane unit.

It has been demonstrated that the temperature sensor should be arranged in the area of the pane edge lying underneath in installed state of the glazing, as here shading by window lintels and reveals is generally least pronounced. In such cases, it is especially preferred that the temperature sensor is arranged in the center section of the pane edge of the glazing lying underneath in installed state. Of course, during installation of the glazing according to the invention, it must be ensured that the area of the spacer frame in which the temperature sensor is arranged is not shaded to a greater extent than necessary by frame elements or the like.

In order to simplify installation, the connecting lead of the temperature sensor can form, at least over part of its length, a single structural unit with the supply lead of the electrochromic pane unit.

It is preferable to use as temperature sensor a temperature sensor utilizing the temperature dependence of the electrical resistance of semiconductors, such as silicon or of metals, or another temperature sensor supplying an evaluatable electrical signal, such as for example a thermocouple. Sufficiently accurate measuring sensitivity in the range of approximately −20° C. to +100° C. is necessary for reliable control of the electrochromic pane unit. The temperature sensor should be (prevented) suitable to withstand mechanical stresses during installation and should be compatible with the double-glazing adhesives and sealants normally used. Minimum possible size and long service life are other requirements.

Suitable for spacer frames are both metal profiles and plastic profiles, as well as composite profiles of different materials. For metal profiles, it is basically possible to use the profile geometry and materials customary in the manufacture of double-glazing units. It is preferable for the glazing units according to the invention to use cavity profiles in whose cavity is inserted a desiccant for dehumidifying the interspace. Materials used as standard are steel and stainless steel, also aluminium or aluminium alloys. Also when using spacer frames of plastic profiles or plastic compounds, basically all usual profile shapes and materials can be considered. Again, cavity profiles are preferable. The known low impermeability to vapor diffusion of plastic materials will be compensated for by arrangement of a vapor-diffusion impermeable layer bridging the interspace, for example a metal foil. A plastic profile of such configuration, used in preference for the glazing according to the invention, is the subject of the unpublished DE 298 07 418 U1. Suitable plastic materials are for example polypropylene, polyethylene terephthalate, polyamide or polycarbonate. The metal foil will consist preferably of stainless steel or tinned or chromium-plated sheet iron. Surprisingly, even in the case of such in themselves inefficiently thermally conductive spacer profiles, the region of the spacer frame represents a thermal bridge stabilizing the temperature detected by the temperature sensor, so that the invention can also be used in the case of glazings with these profiles.

BRIEF DESCRIPTION OF THE DRAWINGS

The invention will be described in detail with the aid of the drawings included. These show.

DESCRIPTION OF THE PREFERRED EMBODIMENTS

Figure 1:
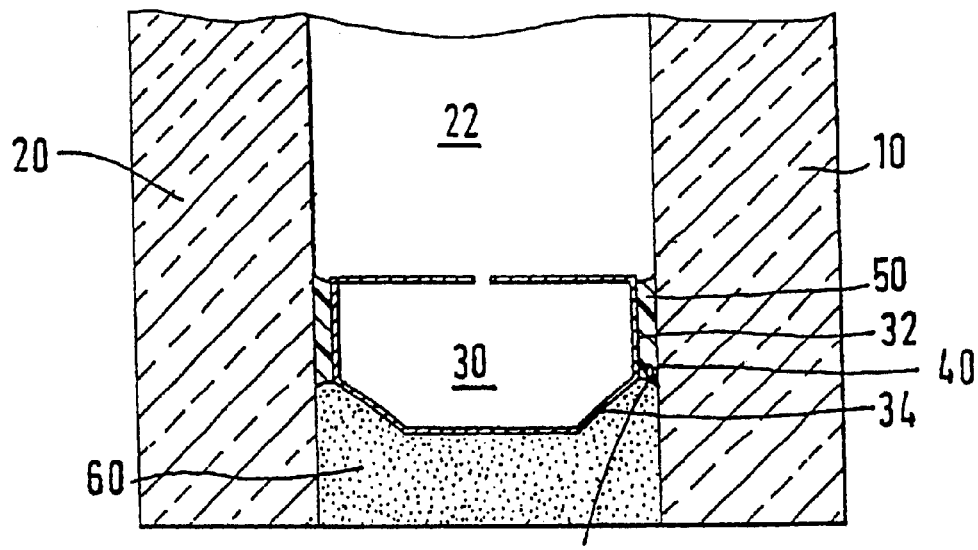
FIG. 1 a partially sectioned view of an electrochromic glazing of a first embodiment of the invention.

FIG. 1 illustrates a first embodiment of an electrochromic glazing with temperature sensor 40 attached according to the invention. The electrochromic glazing comprises an electrochromic pane unit 10 which is not reproduced in detail in respect of its coating structure, which is joined by means of a spacer frame 30 to a further pane 20 to form a double-glazing unit. This pane 20 normally consists of inorganic or organic glass. It can be coated or finished in another way in order to impart to the glazing further special properties, such as increased thermal insulation or sound insulation. The spacer frame 30 is produced of approximately 0.3 mm thick sheet iron as cavity profile suitable for accommodating desiccant. On the locating wall 32 of the spacer frame 30, intended for location on the pane inside of the electrochromic pane unit 10, a temperature sensor 40 intended for temperature detection is embedded in the sealant 50 applied to the locating wall 32 with a thickness of 0.2–0.4 mm, this being a polyisobutylene-base butyl sealant. On the outer edge of the electrochromic glazing, the spacer frame 30 is covered with a polysulfide bonding 60, also protecting the temperature sensor 40 from environmental influences.

Figure 2:
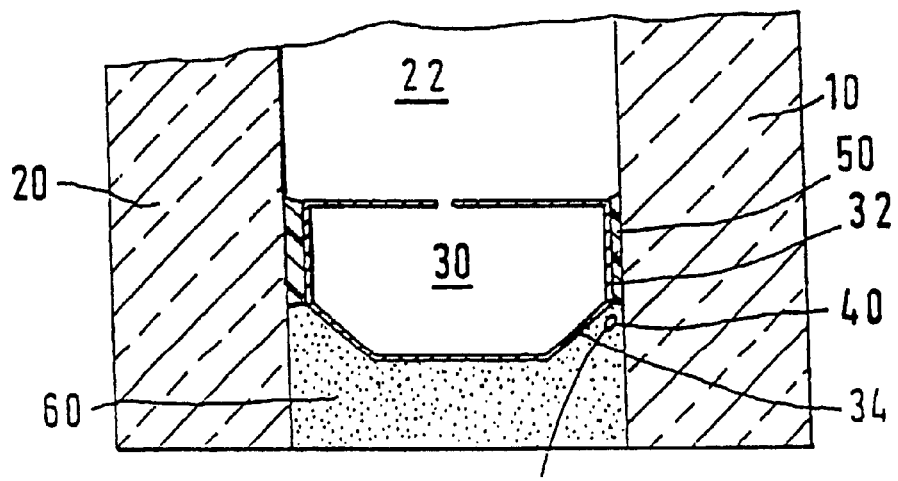
FIG. 2 a sectioned view similar to FIG. 1 with modified arrangement of the temperature sensor.

The embodiment of an electrochromic glazing illustrated in FIG. 2 corresponds to a very large extent to that illustrated by FIG. 1. Here however, differing from FIG. 1, the temperature sensor 40 is arranged in the angles section 34 of the locating wall 32, inside the bonding 60 overlapping the spacer frame 30 on the outside.

Figure 3:
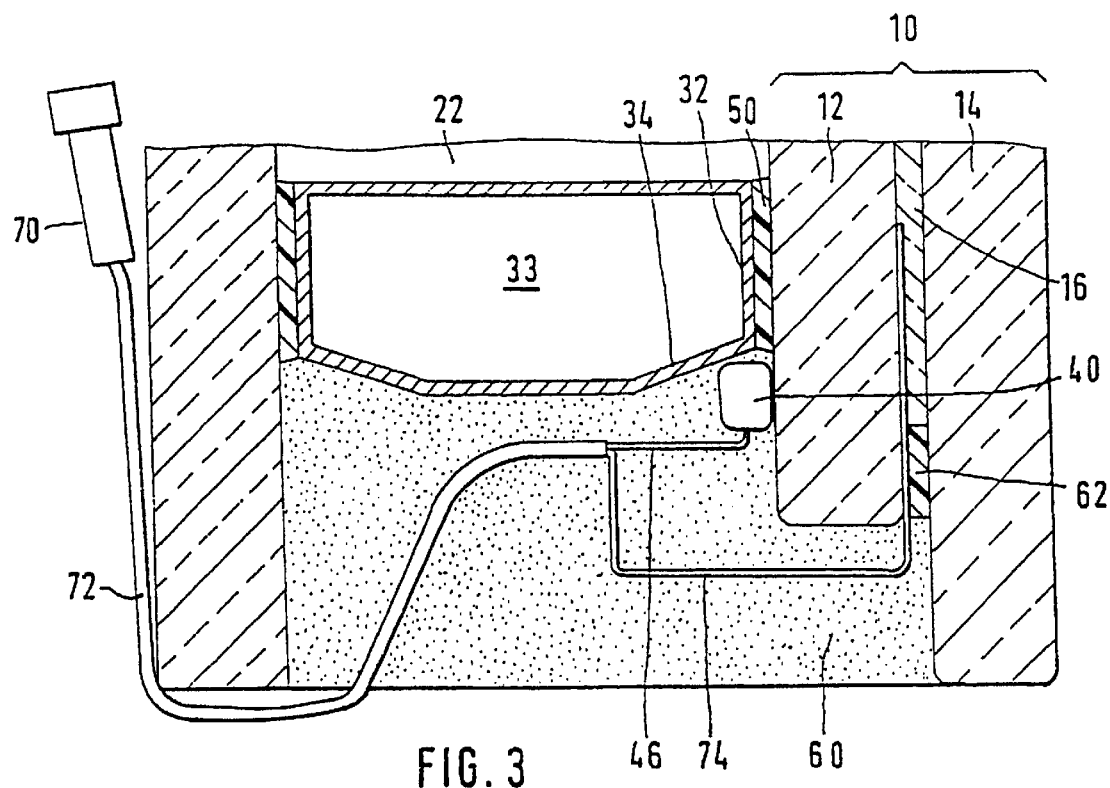
FIG. 3 a partially sectioned view of a further embodiment of the invention which also illustrates the electrical connections.

FIG. 3 illustrates the edge area of the electrochromic glazing in further detail. The electrochromic pane unit 10 consists of an inner pane 12 and an outer pane 14 of glass and an electrochromic coating arrangement 16 only indicated which is arranged between panes 12 and 14 and is protected by a seal 62 from environmental influences. The temperature sensor 40 is attached, directly adjacent to an angled section 34 of the locating wall 32 of the spacer frame 30 provided with a thin sealant coating 50, directly on the surface of the inner pane 12 of the electrochromic pane unit 10 facing towards the interspace 22. The supply lead 74 and the connecting lead 46 of the temperature sensor 40 leading into a connection for linkage to the control and supply device 70 of the electrochromic pane unit 10, are configured as a compact structural unit as far as the vicinity of the temperature sensor 40. They run inside the bond 60 and outside the glazing at least along part of their length into a common cable sleeve 72. The supply lead 74 for the electrochromic pane unit 10 runs subsequently around the edge of the inner pane 12, recessed in relation to the outer pane 14 for this purpose, as far as the electrochromic pane unit 10 which is not illustrated in detail.

Of course, according to the space conditions at the installation site of the electrochromic glazing or its geometry, a different course of the connecting and supply cables is possible. Thus, the temperature sensor 40 and connection points of the electrochromic pane unit 10—at variance from the example illustrated in FIG. 7—can also be provided in the area of different edges of the glazing. In all cases however, it is preferable for the supply lead 74 for the electrochromic pane unit 10 and the connecting lead 46 of the temperature sensor 40 to be combined inside the bond 60 and for them to be led out jointly at a suitable point to a common connection point 70.

Figure 4:
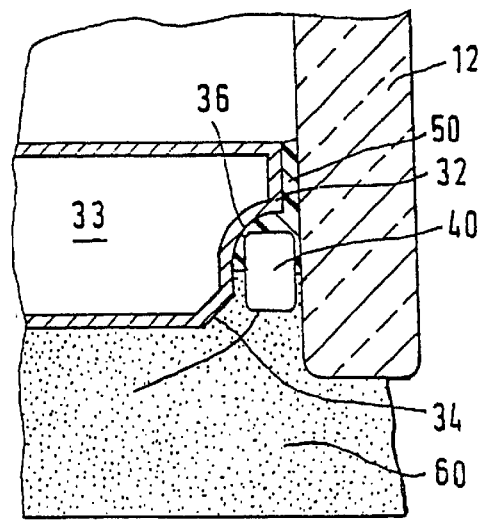
FIG. 4 a diagrammatic partially sectioned view of an electrochromic glazing with a modified spacer frame.

In the case of the embodiment of the invention shown in FIG. 4, the temperature sensor 40 is arranged in a recess or indentation 36 in the locating wall 32 of the spacer frame 30 close to the inner pane 12 of the electrochromic pane unit 10.

Figure 5:
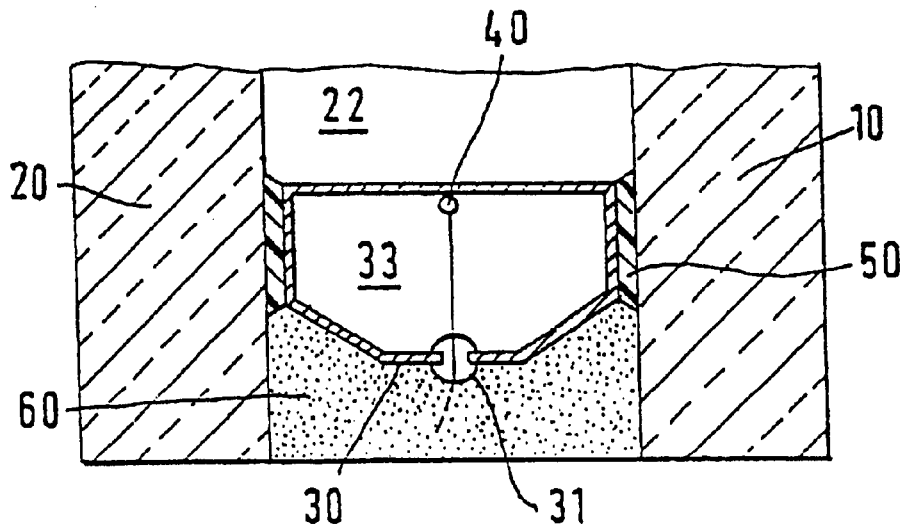
FIG. 5 a further partially sectioned view, similar to FIG. 1, with arrangement of the temperature sensor in the desiccant cavity of the spacer frame.

In the embodiment shown in FIG. 5, the temperature sensor 40 is led through a small hole 31 in the outer wall 38 of the spacer frame 30 as far as the surface of its inner wall 37 facing away from the interspace 22 and is thus located inside the desiccant cavity 33 formed in the spacer frame 30.

Figure 6:
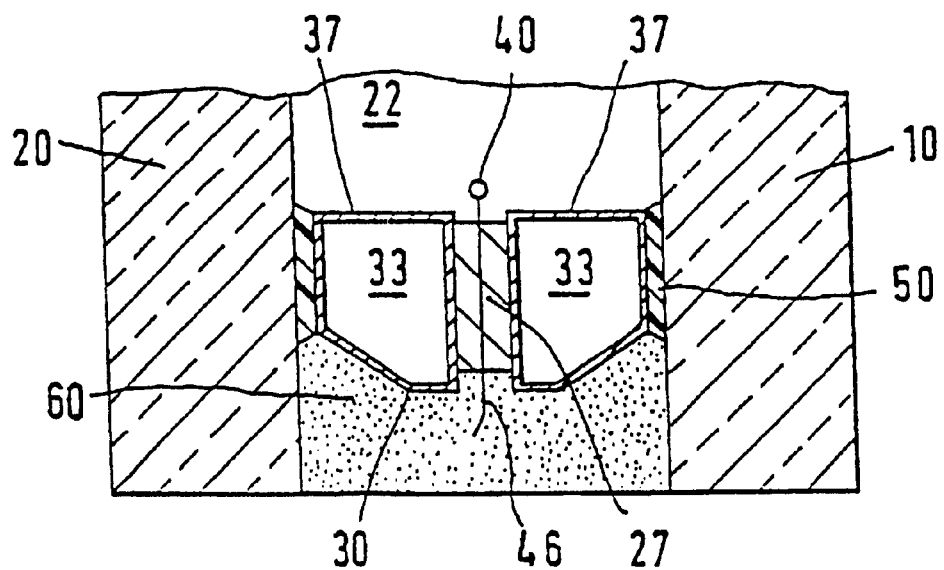
FIG. 6 a partially sectioned view similar to FIG. 1, with arrangement of the temperature sensor in the interspace.

In the case of the embodiment shown in FIG. 6, a spacer frame divided into two parts 30 with a connecting element 27 joining the two halves is used, where the connecting lead 46 of the temperature sensor 40 is led through the connecting element 27. The temperature sensor 40 projects slightly past the inner wall 37 of the spacer frame 30 into the interspace 22. Alternatively, it could be led through suitable holes in the inner wall and the outer wall of a usual spacer frame. It should at all events be arranged at only a slight distance from the spacer frame, so that sufficient heat transfer still takes place through thermal conduction, thermal radiation or convection from it. This will generally be the case when the distance is not more than approximately 5 mm.

Figure 7:
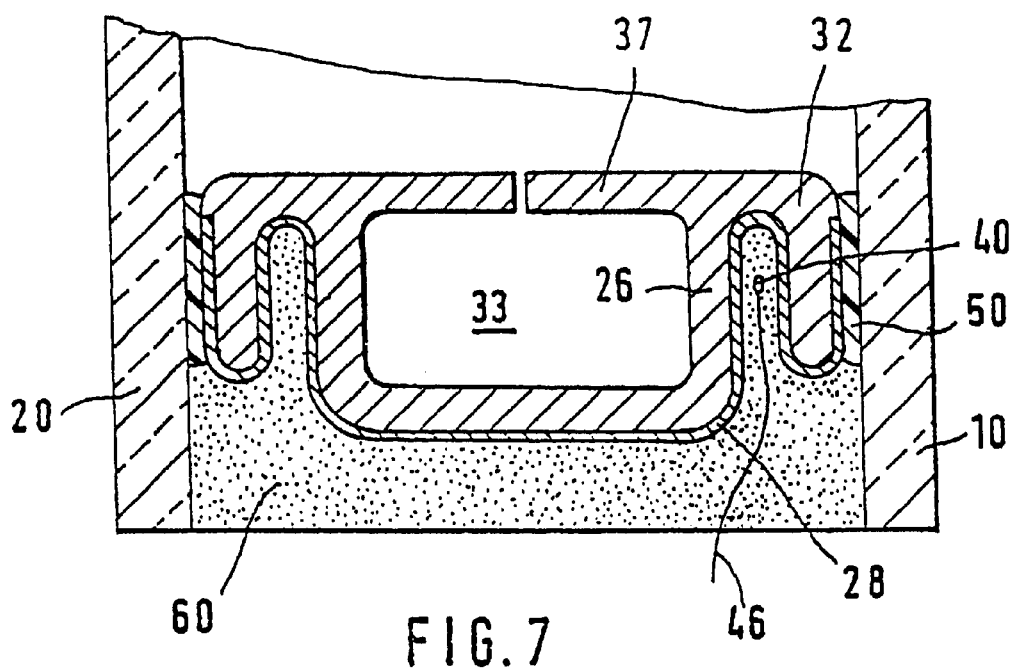
FIG. 7 a partially sectioned view of an electrochromic glazing with a special spacing profile.

In FIG. 7, a spacer frame according to DE 298 07 418 U1 is illustrated. It incorporates as special feature a locating wall 32 at a distance from the desiccant cavity 33. The temperature sensor 40 is arranged between the locating wall 32 and the adjacent wall 26 of the desiccant cavity 33 and is embedded in the bond 60. Also visible is a vapor diffusion impervious metal foil 28 bridging the interspace.

Figure 8:
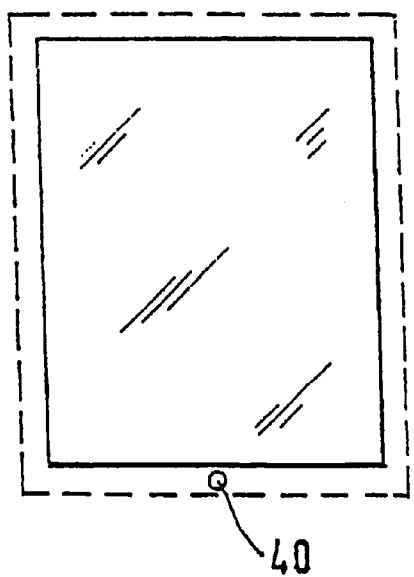
FIG. 8 a diagrammatic illustration of a window with an electrochromic glazing according to the present invention.

FIG. 8 shows in diagrammatic form how an electrochromic glazing according to the invention is to be arranged as a window. The temperature sensor 40 is located during installation at the window-sill side (bottom edge) of the window and there approximately centrally. It has been found that there the impairment of measuring accuracy through shading of the temperature sensor 40 by lintels and reveals with the moving sun is least serious.

The features disclosed in the foregoing description, in the claims and/or in the accompanying drawing may, both separately and in any combination thereof, be material for realizing the invention in diverse forms thereof.

What is claimed is:

1. An electrochromic glazing, with an electrochromic pane unit and at least one additional pane, which are joined to one another in the edge area by means of a spacer frame, forming an interspace, and with a temperature sensor for detection of the temperature of the electrochromic pane unit, wherein the temperature sensor is arranged in the region of the spacer frame between the electrochromic pane unit and the other pane.

2. An electrochromic glazing in accordance with claim 1, wherein the temperature sensor is embedded at least partially in adhesive or sealant.

3. An electrochromic glazing in accordance with claim 1, wherein the temperature sensor is arranged directly on the surface of the inner pane of the electrochromic pane unit facing towards the interspace.

4. An electrochromic glazing in accordance with claim 1, wherein the spacer frame incorporates a recess in the locating wall for the electrochromic pane unit, in which the temperature sensor is arranged.

5. An electrochromic glazing in accordance with claim 1, wherein the temperature sensor is arranged in the interior of the spacer frame, in particular in a desiccant cavity formed in the spacer frame.

6. An electrochromic glazing in accordance with claim 1, wherein the temperature sensor is arranged on the side of the inner wall of the spacer frame facing towards the interspace.

7. Electrochromic glazing in accordance with claim 1, wherein the locating wall of the spacer frame facing towards the electrochromic pane unit possesses a section angled away from the electrochromic pane unit and that the temperature sensor is arranged between this section and the electrochromic pane unit.

8. An electrochromic glazing in accordance with claim 1, wherein the temperature sensor is arranged in the area of the pane edge located underneath in installed state of the glazing.

9. An electrochromic glazing in accordance with claim 8, wherein the temperature sensor is arranged in the center section of the pane edge located underneath in installed state of the glazing.

10. An electrochromic glazing in accordance with claim 1, wherein the connecting lead of the temperature sensor, at least in some areas, forms a structural unit with the supply lead for the electrochromic pane unit.

* * * * *